July 24, 1962 H. G. THOMAS ET AL 3,045,486
METER REGISTER
Filed March 18, 1957 2 Sheets-Sheet 1

INVENTORS
HERBERT G. THOMAS
HARRY J. CORNISH
COURTNEY C. SHENKLE
BERNARD LAST
BY
ATTORNEYS

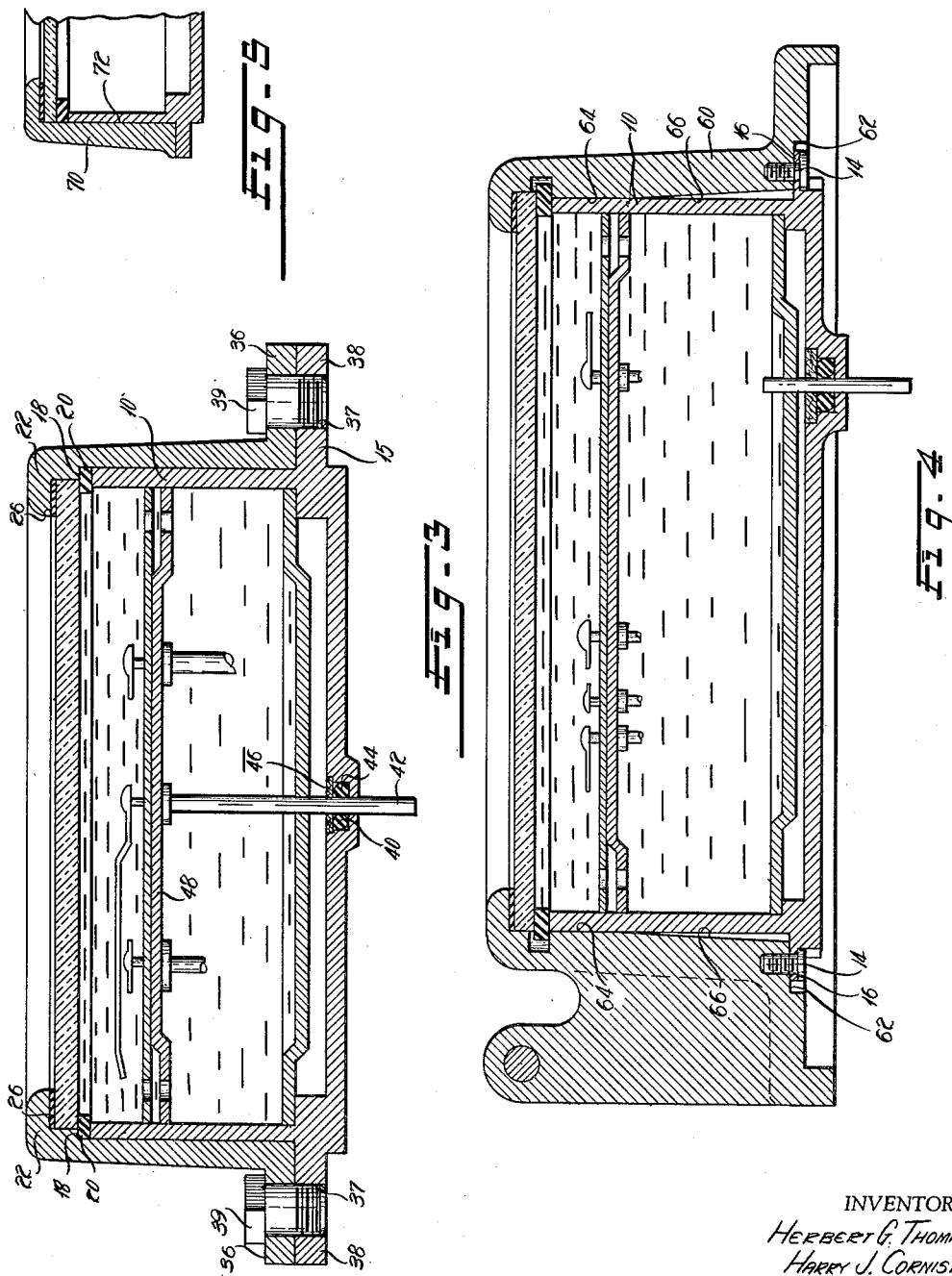

United States Patent Office 3,045,486
Patented July 24, 1962

3,045,486
METER REGISTER
Herbert G. Thomas, Harry J. Cornish, Courtney C. Shenkle, and Bernard Last, all of Uniontown, Pa., assignors to Rockwell Manufacturing Company, Pittsburgh, Pa., a corporation of Pennsylvania
Filed Mar. 18, 1957, Ser. No. 646,761
5 Claims. (Cl. 73—273)

This invention relates to meter register improvements and particularly to special housing structure for oil immersed registering mechanism.

In known fluid meters, particularly water meters of the type disclosed in U.S. Patent No. 1,845,536, issued February 16, 1932, the registering mechanism is exposed to the corrosive action of condensed moisture and air in contact with the moving parts. Corrosive deposits which form on moving parts interfere with their sensitive action and accuracy of the registering mechanism, and require expensive maintenance and frequent replacement.

Another problem is that moisture which condenses on the underside of the window through which the indicating dials are observed, makes the reading thereof difficult and sometimes impossible.

It has been known, for example as shown in U.S. Patent No. 1,146,674, issued July 13, 1915, to immerse the registering mechanism for water meters in oil so as to avoid the above moisture difficulties; but the compartments holding the oil are part of the meter casing. It is the practice to fill such compartments at the factory before installing the meter in the field. Thus, replacing a broken window glass, or repairing a damaged registering and indicating mechanism, requires closing the water line and removing the complete meter unit.

The major object of this invention is to provide a novel fluid tight housing structure for an oil immersed registering and indicating mechanism for fluid meters, the same being readily attachable and detachable from a fluid meter in the field as a sealed unitary replacement part.

A further object of this invention is to provide for an oil immersed registering and indicating mechanism a fluid tight housing structure having an integral cup structure which requires a minimum of fluid tight seals.

Other objects of the invention will become apparent from the description herein.

For a fuller understanding of the nature and objects of the invention, reference should be had to the following detailed description and drawing, in which:

FIGURE 3 is a transverse sectional view taken on the line 3—3 of FIGURE 2;

FIGURE 4 is a transverse sectional view of a registering and indicating housing, illustrating another embodiment of the invention; and FIGURE 5 is a transverse fragmentary sectional view of a registering and indicating housing, illustrating another embodiment of the invention.

Figure 1:
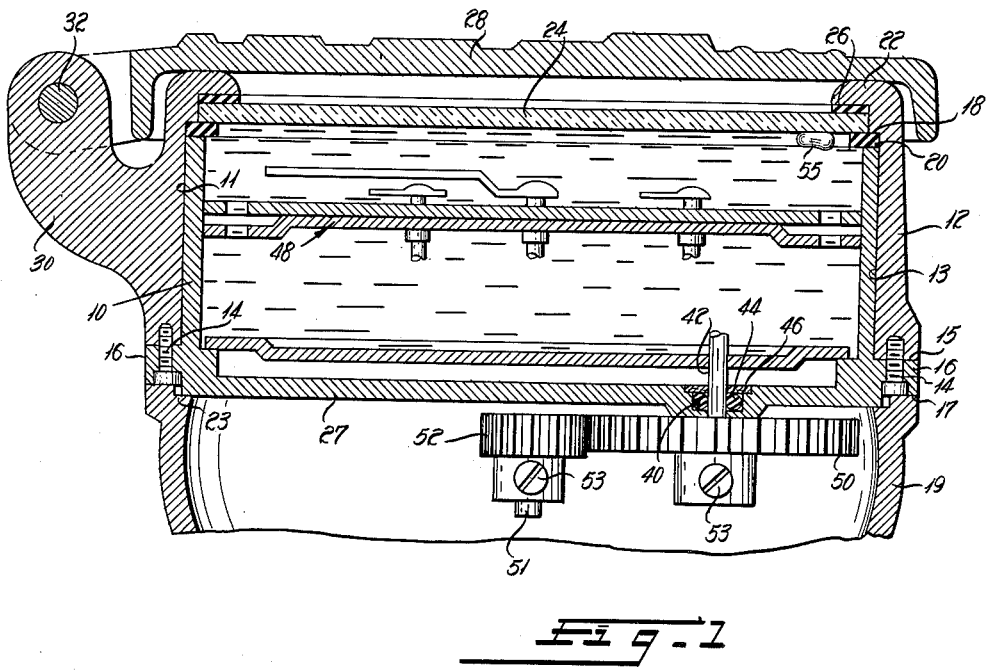
FIGURE 1 is a fragmentary transverse sectional view showing the register housing according to a preferred embodiment of this invention mounted on a fluid meter casing.

FIGURE 1 illustrates a cup 10 having a cylindrical surfaced side wall 11 fitting snugly within a registering and indicating housing 12 having an internal cylindrical surface 13. Cup 10 is rigidly attached to housing 12 at the bottom edge of the sides thereof by screws 14 which extend through a continuous external flange 16 disposed about the bottom periphery of the cup. The flange 16 has flat annular top and bottom surfaces 15 and 17. The bottom flat edge of housing 12 seats on surface 15. Surface 17 seats on the annular flat upper edge of a meter gear casing 19, and the bottom wall 27 of cup 10 seats on an internal upwardly facing casing shoulder 23. Within housing 12 is a downwardly facing shoulder 18. A rubber or like resilient gasket 20 is clamped against that shoulder by the top flat edge of cup 10. The upper edge of housing 12 has an inwardly turned lip 22 which extends over a window glass 24. A paper or like compressible gasket 26 is disposed between the lip 22 and glass 24 and the glass is supported from below on gasket 20. In order to protect the window glass from being accidentally broken, a metal cover 28 is pivotally mounted on an ear 30 by means of a pin 32. When screws 14 are tightened, the glass 24 is clamped and sealed between the lip 22 and cup 10 whereby a fluid tight seal is formed at the top of the register assembly, and gasket 20 prevents leakage of oil down the cylindrical surface 13.

Figure 2:
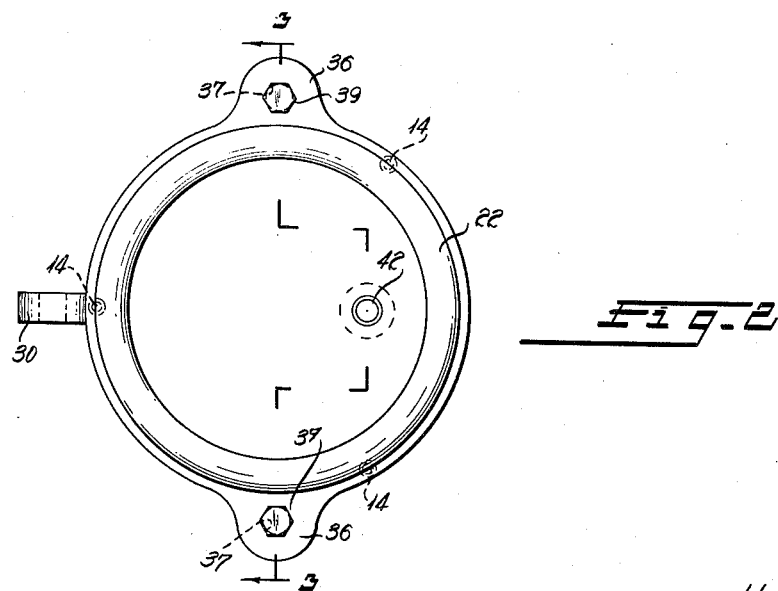
FIGURE 2 is a top plan view of the housing of FIGURE 1 with the cover and registering and indicating mechanism removed to show the bottom cup.

Housing 12 is mounted on fluid meter casing 19 by means of lugs 36 shown in FIGURES 2 and 3. The flange 16 has cooperating lugs 38 extending therefrom which are in alignment with lugs 36. Bores 37 formed through the lugs 36 and 38 are adapted to receive bolts 39 for rigidly attaching the housing 12 to the meter casing 19.

Cup 10 has a spindle aperture 40 in the bottom thereof. A rotatable spindle 42 extends through aperture 40 and a seal is provided therein as by a rubber O ring 44 and a seal retaining washer 46. The spindle 42 drives a conventional registering and indicating mechanism 48 mounted in cup 10. The spindle 42 is drive connected to the piston of a fluid meter (not shown) by means of gear 50, pinion 52 and shaft 51. The gear 50 and pinion 52 are mounted on their respective spindles by means of set screws 53.

The cup 10 is substantially filled with a light, low viscosity, substantially transparent oil. The oil is chemically inert to the brass and steel parts making up the registering and indicating mechanism 48 and its viscosity is sufficiently low so as not to impose a drag on the moving parts. The viscosity index of the oil, that is its change in viscosity with temperature, should be sufficiently low to permit use through the range of ambient temperatures usually encountered in typical water meter installations. Also, the oil must have a color which is sufficiently light and transparent to permit easy reading of the submerged indicating dials on the registering and indicating mechanism. An example of an oil having the above physical properties is "Shell Diala-AX," which is a light petroleum transformer oil. The oil is usually placed in cup 10 before the cup is attached to housing 12.

It is desirable to incorporate into the oil a large air bubble 55 to allow for expansion and contraction due to ambient temperature changes. If the cup were completely filled, expansion of the oil with a rising temperature might either destroy the seals or break the glass.

Referring now to FIGURE 4 of the drawing, there is illustrated another embodiment of the invention. A cup 10, which is identical with the cup described hereinbefore, is fitted in a registering and indicating housing 60. The lower edge of the sides of housing 60 is provided with an internal shoulder 62 to seat flange 16 in the indented portion formed by the shoulder. The cup 10 is rigidly attached to housing 60 by flange 16 and screws 14 as described hereinbefore. The upper inside surface of housing 60 has a cylindrical portion 64 that fits tightly with the corresponding cylindrical outside surface of cup 10. The lower inside surface 66 of housing 60 is tapered to slope away and out of contact with the outside surface of cup 10. By means of this construction, only a small portion of the housing 60 must be machined to close tolerances.

In the embodiment illustrated in FIGURES 1 through 3, the outside diameter of the cup is 2.678 inches with a tolerance +.000 and −.003 inches. The inside diameter of the registering and indicating housing 12 is 2.688 inches with a tolarance of ±.002 inches. With the embodiment shown in FIGURE 4, it is necessary to have only the surface areas which are in contact made within required tolerances.

Illustrated in FIGURE 5 of the drawing is another embodiment of the invention in which a housing 70 has a continuous internal cylindrical surface 72. The embodiment of FIGURE 5 is exactly the same as shown in FIGURES 1 and 3 except that the downwardly facing shoulder 18 has been eliminated therefrom.

As is readily apparent from the drawings, the housing assembly in which the registering and indicating mechanism is mounted and housed may be easily removed and installed on fluid meters in the field as a replacement part in the form of one sealed unit. With a cup formed of an integral one piece construction as shown, joints where a possible leak may occur are held to a minimum. In the embodiments illustrated there are only two sealing joints, one between the cup and the window glass, and the other around the driving spindle.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fluid meter, a meter casing, a registering and indicating housing removably mounted on said meter casing, a cup fitting in said housing, the cup having mounted therein a meter registering and indicating mechanism, a window in the upper end of said housing closing said cup, means forming a liquid tight compressible seal between the cup and the window, an inwardly extending lip on said registering and indicating housing, the lip overhanging said window, a flange extending outwardly from the lower end of said cup, said cup having a side wall within the housing and the upper end of the side wall engaging said seal means, means cooperating with said flange to rigidly attach the cup to said registering and indicating housing and urge said upper end of the cup against said seal means to compress the latter, a spindle aperture in the lower end of said cup, a rotary spindle in said aperture interconnecting the registering and indicating mechanism with the fluid meter, sealing means surrounding the spindle in said aperture, and a light, low viscosity, substantially transparent oil filing said cup to a desired level for protective coverage of said mechanism.

2. In an oil immersed register assembly, a housing having an opening in its lower end and an open upper end surrounded by an annular downwardly facing seat, a transparent window mounted to extend over said seat, a cup having an upright side wall smoothly telescoped within said housing, and an integral bottom wall formed with a spindle receiving opening, register mechanism within said cup immersed in oil, a resilient annular gasket disposed between the upper edge of said side wall and the bottom peripheral surface of said window, and means rigidly securing said cup to said housing whereby said cup bottom wall closes the lower end opening of said housing and said gasket is compressed between the cup and window and seals against escape of oil from said assembly, said window being thereby urged toward said seat by said means securing the cup to said housing.

3. In the assembly defined in claim 2, an internal shoulder within said housing on which the outer periphery of said gasket is seated.

4. In a liquid meter, a register housing open at top and bottom, an annular internal lip around the top opening, a transparent window covering said top opening and having flexible upper and lower annular gasket means on both sides of its periphery, an upwardly open cup enclosed within said housing with its upper edge engaging the lower gasket means, and means rigidly securing said cup to said housing urging the upper edge of said cup tightly against said lower gasket means, said upper gasket means being disposed between said window and said lip and the bottom of said cup closing the bottom opening of said housing, and said cup being adapted to contain transparent oil immersing the register mechanism to a predetermined level.

5. In a fluid meter, a meter casing having an opening in the top thereof, a registering and indicating housing mounted on the top of said meter casing over said opening, said housing being open at both top and bottom, an upwardly open cup fitting into said housing from the bottom of said housing with the bottom of said cup closing both the bottom opening of said housing and the top opening of said meter casing, said cup having mounted therein a meter registering and indicating mechanism, a window in the upper end of said housing closing said top opening of said housing and also closing the upper end of said cup, means above said window rigid with said housing preventing movement of said window outwardly through said top opening of said housing, compressible sealing means disposed adjacent the outer periphery of said window between said window and the upper edge of said cup, means securing said cup to said housing and urging said cup and housing relatively axially to compress said sealing means and form a liquid tight seal between the cup, housing and window, a spindle aperture in the bottom of said cup, a rotary spindle in said aperture interconnecting the registering and indicating mechanism with the fluid meter, sealing means surrounding the spindle in said aperture, and a light low viscosity substantially transparent oil substantially filling said cup sufficiently to protectively cover said mechanism to a desired level.

References Cited in the file of this patent

UNITED STATES PATENTS

| | | |
|---|---|---|
| 165,673 | Helme | July 20, 1875 |
| 1,146,674 | Van Gilder | July 13, 1915 |
| 1,495,010 | Ford | May 20, 1924 |
| 2,246,250 | Hanks | June 17, 1941 |
| 2,354,563 | Weisse | July 25, 1944 |
| 2,738,672 | Smith et al. | Mar. 20, 1956 |
| 2,757,364 | Hood | July 31, 1956 |
| 2,764,022 | Hague | Sept. 25, 1956 |

FOREIGN PATENTS

| | | |
|---|---|---|
| 346,770 | Italy | Mar. 5, 1937 |